United States Patent [19]

Hubbard

[11] Patent Number: 4,881,430

[45] Date of Patent: Nov. 21, 1989

[54] METHOD OF MAKING HETEROGENEOUS BLADE-LIKE METALLIC CUTTER MEMBER

[76] Inventor: Arthur J. Hubbard, 574 Cutlers Farm Rd., Monroe, Conn. 06468

[21] Appl. No.: 240,504

[22] Filed: Sep. 6, 1988

[51] Int. Cl.[4] ............................................. B21K 11/02
[52] U.S. Cl. ................................. 76/104 R; 228/186; 228/190; 228/214; 29/424; 72/363
[58] Field of Search .......... 76/104 R, 101 R, DIG. 6; 228/186, 190, 214; 72/363; 29/424

[56] References Cited

U.S. PATENT DOCUMENTS

| 1,008,941 | 11/1911 | Blakeslee | 228/44.3 |
|---|---|---|---|
| 1,607,083 | 11/1926 | Ignatieff | 76/104 |
| 2,837,817 | 6/1958 | Kelley | 29/424 |
| 3,068,564 | 12/1962 | Wiedt, Jr. | 228/190 |
| 3,164,884 | 1/1965 | Noble et al. | 228/186 |
| 3,869,227 | 1/1959 | Bradstreet | 29/424 |
| 3,902,942 | 9/1975 | Vecchiarelli | 156/145 |
| 4,399,611 | 8/1983 | Maringer | 30/350 |

*Primary Examiner*—Roscoe V. Parker
*Attorney, Agent, or Firm*—H. Gibner Lehmann; K. Gibner Lehmann

[57] ABSTRACT

The method of making a heterogeneous, Damascus-type cutting blade, comprising forming an open metal enclosure, placing a stack of metal foils in the enclosure, placing a metal plate in the enclosure on top of the stack of foils, folding in portions of the enclosure on said plate to compress the latter and stack of foils, heating and hammering the enclosure and foils to bond the same together, removing the enclosure from the bonded foils, and finish-griding the bonded foils.

21 Claims, 2 Drawing Sheets

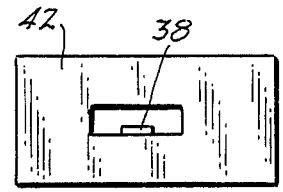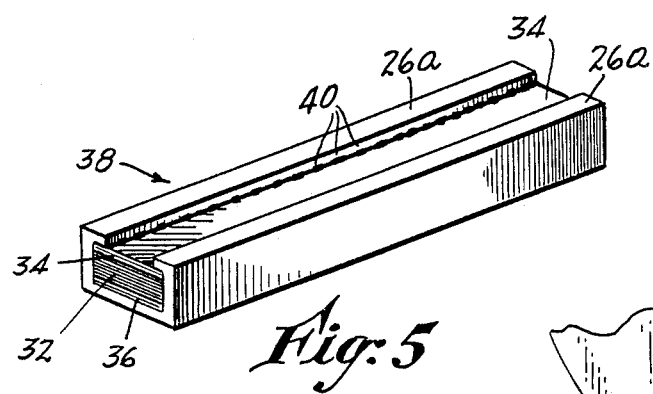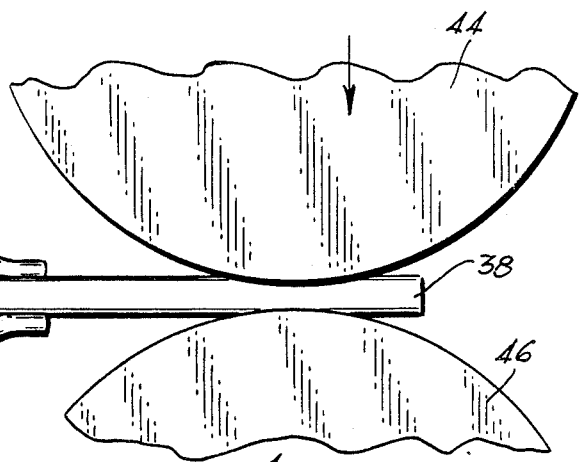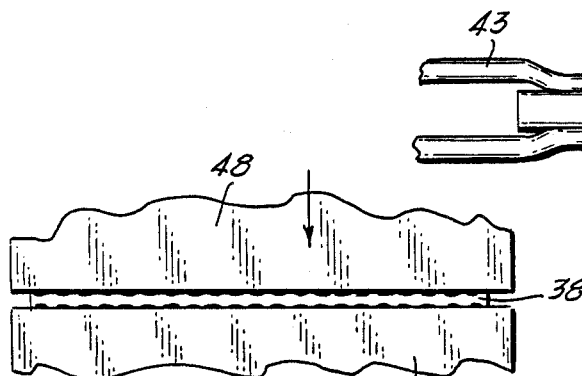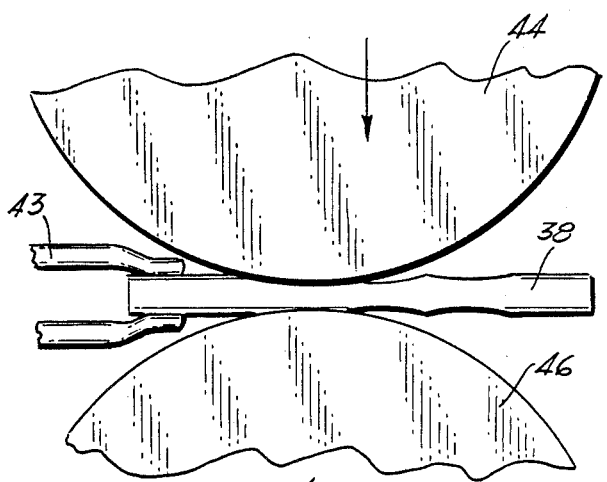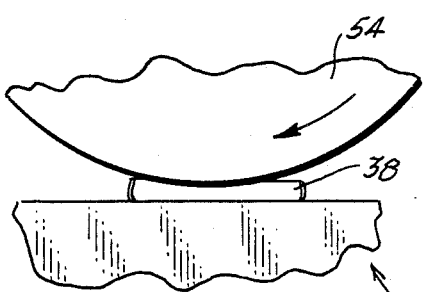

METHOD OF MAKING HETEROGENEOUS BLADE-LIKE METALLIC CUTTER MEMBER

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to the making of heterogeneous blade-like cutter members constituted of different metals, and more particularly to the making of Damascus-type metal blades or cutters.

DESCRIPTION OF THE RELATED ART INCLUDING INFORMATION DISCLOSED UNDER 37 CFR §§1.97–1.99

A prior patent disclosing a Damascus-type knife blade and method of making the same is U.S. Pat. No. 4,399,611 dated Aug. 23, 1983. This patent explains the assembling of a stack of alternate steel and brazing foils, and the heating of the stack only sufficiently and under light pressures to bond together the steel sheets or strips. Then surface portions of the bonded stack are ground away according to a predetermined pattern, after which the thus-processed stack is hammered or rolled to completely flatten it, whereupon a decorative design is had on the stack. The patent does not disclose any means or method for enclosing and compressing the stack before the heating or firing of the same, and it is believed that considerable difficulty and spoilage could be experienced in carrying out the method as proposed by the above patent.

A prior U.S. Pat. No. 2,837,817 issued to Floyd C. Kelly on June 10, 1958 discloses a method of making thin, foil-like molybdenum or tungsten sheets having formed shapes, such as a cup shape, without incurring cracks. It does not deal with laminated articles of cutlery or cutters, or with a stack of foils, or even with a plurality of foils, but instead teaches the bonding of a single flat foil of molybdenum or tungsten to an iron plate, to which bonded assemblage a stainless steel plate then is welded as a cover or shield. Thereafter the assemblage is heated and rolled, the stainless plate removed, and the resultant laminate formed into the desired shape, such as a cup. Then the iron is etched away by acid, to leave the tungsten or molybdenum cup. The patent does not disclose a stack of foils nor the problems involved with assembling and rigidizing such a stack, and then forging the assembled foils to each other, after which finishing or grinding operations can be done to produce a cutter member or blade.

The classical method of producing a Damascus-type blade, as presently understood, is to start with a plurality, typically five, of thick steel strips (as for example each having a thickness of ¼") which strips are forged together to form an elongate laminate that is then folded on itself to give half the length, forged to unite the folds, folded again, forged again, etc., until a blank is obtained which has a very large number of extremely thin laminations. As many as 320 laminations can be readily had in this manner. A unique property of Damascus-type blades is the ability to flex greatly without breakage, while still retaining the hardness of high-carbon steel.

In this connection, an understanding of the make-up and problems of Damascus blades will be useful. The conventional non-laminated knife blade is usually made of a high carbon steel which is hardened and tempered so that it will take and hold a sharp edge with adequate strength to resist breaking. The key hardening ingredient in the steel is carbon. In quantities of carbon between 0.5% and 1.5% the hardening can be readily effected. If the blade is left in the as quenched or full hard condition it will not bend safely but instead can break easily because of its brittleness. Some hardness must therefore be sacrificed in order to gain toughness, resulting in a compromise product.

It is well recognized that if a very hard and brittle material is made extremely thin, it can be bent and flexed without breaking, as in the case of fiberglass. This principle is put to use in so-called Damascus steel (more accurately called "pattern welded" steel). A Damascus blade is made up of several hundred more or less parallel layers of high-carbon steel separated by layers of soft, low-carbon steel. These are bonded together by hammering or rolling at very high temperatures. When this composite is hardened it can be used in the full-hard condition. The hard and brittle high-carbon steel is in layers which are perhaps 0.0005" thick and can be flexed considerably without breaking. The soft low-carbon steel is the "glue" that holds everything together. The actual knife edge is like a microscopically jagged saw. The soft steel wears away a little but supports the hard steel which does the cutting.

When a Damascus blade is bent sufficiently it will break like a green stick. The outer fibers break first, while the inner fibers hold together longer. A conventional blade, if hardened to a useable degree, breaks cleanly or all at once.

Another favorable characteristic of Damascus steel is its appearance. When the surface is treated with acid, the high- and low-carbon steel layers are etched differently, and a pattern appears in various shades of gray. Long exposure to the etchant gives a three-dimensional effect, as well.

A method of fabrication of a conventional Damascus blade is as follows: The typical blade starts out as a sandwich of perhaps 5 layers of high- and low-carbon steel, 3/16–¼ inch thick, by 1" by 6". Those are usually hand-bound together by a wire, or tack welded at the corners to form a billet. This billet is then heated in an oven or forge, covered with borax flux, re-heated to a light yellow and hammered so that the layers are welded together. Several re-heatings and forgings stretch the billet to twice its length and half its thickness. It is then cut in two or else folded back on itself, and the welding process is repeated. There are now two layers, and they are thinner. The welding, forging and doubling process is repeated six or so times until there are several hundred layers, each about 0.0005" thick. At this point the total mass of metal is about ⅓ of the original, due to oxidation and scaling in the fire. The original blocks of steel are therefore made larger to allow for this loss. The resultant billet or blank is finally forged and ground into a blade.

There are many drawbacks and pit-falls along the way, however. Incomplete welds can result from: (a) non-uniform temperatures in the thick mass; (b) trapped voids in the joined surfaces; (c) incomplete action of the flux; and (d) retained flux.

The metal loss occurs mostly in the outer surfaces that are exposed to the fire and air. This causes a non-uniform reduction in layer thickness as the sequence continues, with little practical consequence but it also reduces the predictability of the pattern.

So far as I am aware, no one has successfully produced in a practical manner a feasible and economical method of forging or bonding stacked metal foils to produce blanks suitable for finishing into cutters or cutting blades.

SUMMARY OF THE INVENTION

The above disadvantages and drawbacks of prior Damascus-type blades and methods of producing the same are obviated by the present invention, which has for one object the provision of an improved method for producing blades of this type, which is especially simple and effective in carrying it out.

Another object of the invention is to provide an improved method for producing Damascus-type steel blades or cutters as above set forth, which reduces greatly the time and difficulty heretofore involved in the bonding-welding-forging operations.

A further object of the invention is to provide an improved method for producing Damascus-type steel blades or cutters in accordance with the foregoing, whereby differing characteristics can be readily produced in the end product.

Yet another object of the invention is to provide an improved method for producing Damascus-type steel, which is more economical to practice and which also results in a greater uniformity and higher quality of product.

For example, the present innovation eliminates at once the lengthy and difficult bonding/welding/forging repetitions, because the final billet is forged and ground from the original weldment whereas the final arrangement and sequence of layers in a conventional Damascus blade is the product of many foldings. The improved result that is had by practicing the present invention, is a superior heterogeneous blade that has desirable physical and visual properties which are constant over its thickness and length.

With the present invention there is had a choice between a given heterogeneous make-up or an infinite number of variations of the same as to the pattern and properties, over the blade thickness and length. The original billet as provided by the invention is constructed of material which is almost as thin as the layers which are to be in the finished blade.

For purposes of illustration a blade made of steel foil or shim stock will now be described. The original billet of stock is made by assembling a plurality of steel shim or foil pieces of, for example, dimensions on the order of 0.002" by 1" by 6". Some of these are of low-carbon soft steel while others are of high-carbon steel or else low carbon steel which has been carburized to give a high-carbon layer that has penetrated some distance into the surface. The top and bottom strips of the stack are preferably different and can consist of material which will not readily weld to itself or to the steel foils; these could be constituted of 2 or 3 pieces of stainless steel shim stock which are painted with a refractory substance to discourage welding. This facilitates removal of an encapsulating steel enclosure after the welding of the foils.

The stack as above is compressed to a thickness which is approximately equal to the sum of the thicknesses of the components. This essentially eliminates any air from between the layers. The stack is then encapsulated in a sheet steel enclosure or envelope which is crimped and/or welded shut to hold the stack in its compressed condition and to isolate it from the contaminating effects of the fire. The ends of the stack can be left exposed without any significant problems.

The assembly is then heated to forging and/or welding temperature and hammered or rolled to weld all the shims or foils together. No flux is used, because none is needed. The edges of the capsule are thereafter cut or ground away, and the top and bottom stainless strips are removed. The welded shim can then be further worked, as by additional forging, and grinding into a blade.

The advantages of the present improved method for making Damascus steel as are follows:

There is a greatly reduced labor cost because the fabrication time is drastically reduced. Also, a minimum amount of skill and judgement is required, and the procedure is well suited to automation. A precise pattern control is had, and distortions and errors previously introduced at each welding in the old method are eliminated. The billet characteristics can be precisely varied over the billet thickness and/or length by selection of the desired foils or shims and their composition, i.e. the center or edges could be of very fine grain to maximize cutting qualities, while the outside could be coarser with a pure nickel lamination included for a distinctive pattern.

As to material cost, any increased cost of shim or foil stock will be offset by the zero loss of material in the processing. Also, there is a low scrap rate, from elimination of the multiple/forging steps.

Given on the following page is a chart showing a comparison of the old method with the present improved method:

| | COMPARATIVE PROCESSING | | |
|---|---|---|---|
| | Conventional | | Improved |
| Billet composition | 2 pcs. High-carbon<br>3 pcs. Low-carbon<br>billet | ¼ × 1 × 6 composition<br>¼ × 1 × 6<br>1¼ × 1 × 6 | 125 pcs.  .002 × 1 × 6 HC = .250"<br>125 pcs.  .002 × 1 × 6 LC = .250"<br>billet  .500 × 1 × 6<br>3 or 4 pcs. stainless steel<br>foil on each side of stack. |
| Preparation for welding<br>Initial Weld | Stacked alternately, bound together by wires or welding corners<br>Blacksmith coal fire, or gas. To red heat, flux applied, to welding temp. (light yellow), hammered to effect weld. | | Stacked alternately, enclosed in sheet steel with open ends.<br>Same fire. Brought to welding temp., hammered to effect weld. Fewer heats required because billet is about ½ the size of conventional. No fluxing required because shims are not exposed. |
| First | Billet edges ground to clean metal. | | |

-continued

COMPARATIVE PROCESSING

| | Conventional | Improved |
|---|---|---|
| inspection | Visual inspection for incomplete welds or cracks. | |
| First forging | Heated to light red, hammered until about twice original length. | |
| Second weld | Cut in two or folded on itself. Bound together, heated, fluxed, heated, welded again. | |
| Second inspection | Same as first inspection. | |
| Second forging | Forged again to double length | |
| Third weld, etc. | Welding, inspection, forging, welding continued approx. 6 times total. Layers progress from 5 to 10, 20, 40, 80, 160, 320. | |
| Final billet | Much of original metal has been lost as scale during the above activity. Billet is .40 × 1 × 6. This is forged to about .20 thickness during fabrication into blade. | Billet is .40 × 1 × 6 after stripping of capsule. This is forged same way as conventional |
| Blade | 320 layers, .002 thick each. | Each HC shim was carburized for about ⅓ its thickness on each side and provides 3 equivalent layers. Total is is 350, average thickness is about .00027. The .002 LC shim is now .0008 thick. |

Other features and advantages will hereinafter appear.

BRIEF DESCRIPTION OF THE DRAWINGS

Referring to the accompanying drawings.

FIG. 5 is a perspective view of the assemblage of FIG. 4, but with side rim portions of the enclosure folded in over the stack of foils.

FIG. 6 is a front elevation of a furnace having the assemblage of FIG. 5 in position for being heated.

FIG. 7 is a fragmentary end elevational view of a pair of rounded dies with the heated billet between them, held with a tongs for the hammering operation.

FIG. 8 is a view like that of FIG. 7 but showing progressive stages in the hammering and fluting of the billet.

FIG. 9 is a fragmentary side elevation of flat dies in the process of hammering the fluted billet.

FIG. 10 is a fragmentary side elevation of a grinder, for performing finishing operations on the forged billet.

DESCRIPTION OF THE PREFERRED EMBODIMENT

Figure 1:
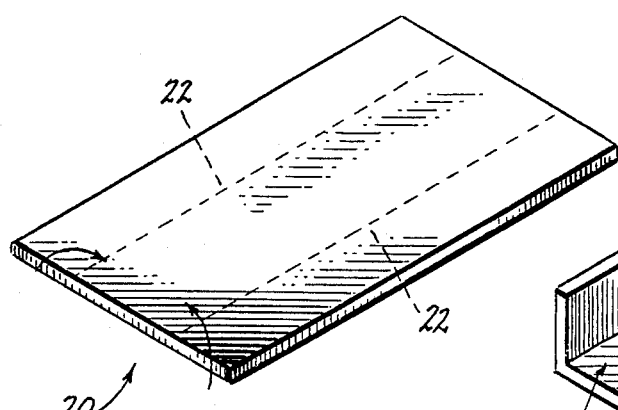
FIG. 1 is a perspective view of a sheet metal blank prior to being formed into an enclosure for receiving a stack of foils or shims.
Figure 2:
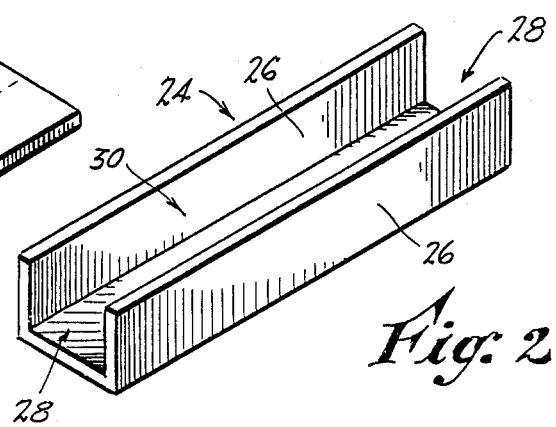
FIG. 2 is a perspective view of an enclosure for a stack of foils, as fabricated from the blank of FIG. 1.

As shown, the enclosure for encapsulating the stack of foils, as provided by the invention, can be easily and economically fabricated from a rectangular sheet metal blank 20 formed of ordinary cold or hot rolled steel, by bending it along two spaced-apart longitudinal fold lines 22, through right angles to form a U-shaped channel configuration indicated generally by the numeral 24 in FIG. 2. The channel 24 is hereinafter also referred to as an open enclosure in the specification and in the appended claims.

It will be seen that the open enclosure 24 has longitudinal side flanges 26 which are parallel to each other and which form two end openings 28 and an elongate, longitudinal side opening 30. Such formation is especially simple and at the same time provides a capsule jacket or casing for the reception of a stack of foils or laminations mad up in accordance with the invention.

Figure 3:
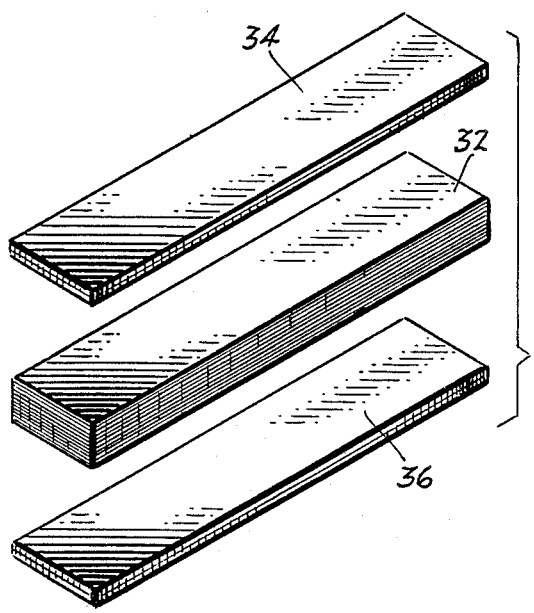
FIG. 3 is an exploded perspective view of a stack of foils prior to insertion into the enclosure of FIG. 2.

Referring to FIG. 3 there is shown in exploded view a composite stack which can be constituted, for example, of a center bunch 32 made up of 125 foils or shims of high-carbon steel interleaved in any desired fashion with 125 foils or shims of low carbon steel, each foil having a thickness of about 0.002". Above and below the bundle 32 are stripping strips or plates 34 and 36 respectively, preferably somewhat thicker than the carbon foils in the bundle 32. The stripping strips 34 and 36 can be each constituted of multiple thicknesses, as for example 2 or 3 pieces, or each could be a single thicker piece. To facilitate the stripping function which occurs after the forging operations occur as described below, the strips 34 and 36 are preferably of stainless steel, and they can be initially prepared by coating them with a suitable refractory substance to discourage any welding, especially to the foils of the bundle 32.

Figure 4:
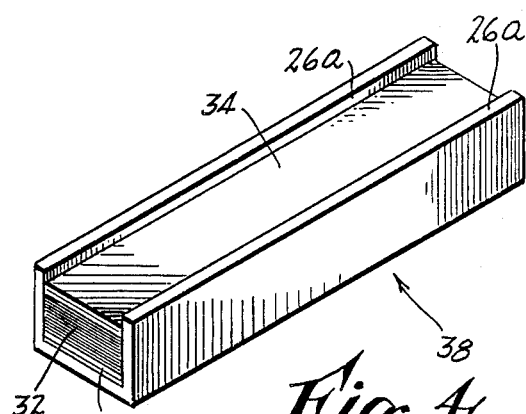
FIG. 4 is a perspective view of the stack of FIG. 3 inserted into the enclosure of FIG. 2.

The composite stack of FIG. 3 is placed in the enclosure 24 through the side opening 30, resulting in an assemblage which is labelled 38 and is shown in FIG. 4. Now the opposite rim portions 26a of the assemblage 38 are folded inward, tightly over the top plate 34, as shown in FIG. 5. Preferably, also the rim portions 26a are welded, as by spot welding 40 shown, or seam welded to the top plate 34 whereby the rim portions become joined to each other, via the plate 34. Thus the casing 24 becomes mostly enclosed, except for the end openings 28 which present no problems as to excluding foreign material from the foils.

FIG. 5 thus shows an assemblage or billet 38 comprising clean, compressed foils of extremely thin alternating high- and low-carbon steels sandwiched between two stainless, coated stripper plates, encapsulated in a mostly closed casing which forcibly confines the foils and stripper plates, all ready for the forging operations. The billet 38 can now be heated to welding temperature, as by placing it in a forge oven 42, shown in FIG. 6, and hammered or rolled to weld together the alternated foils of the bundle 32.

FIGS. 7 and 8 show the billet 38 being held by a tongs 43 and hammered between rounded dies 44, 46, causing a fluting of the billet whereby its opposite faces are fluted. FIG. 9 shows the fluted billet 38 being hammered between flat dies 48, 50 to make its opposite faces flat.

Figure 11:
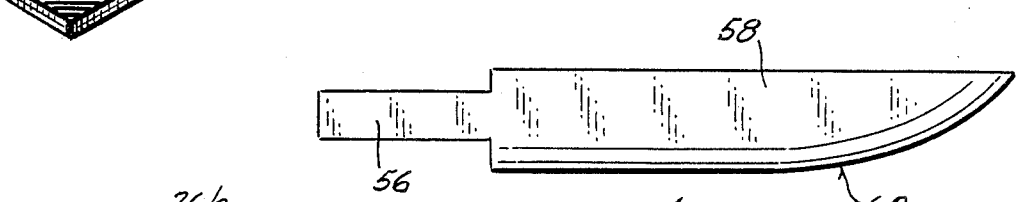
FIG. 11 is a plan view of a blade made from the billet.

The flattened billet 38 is illustrated in FIG. 10 on a grinder 52, having its surfaces ground and finished by a grinding wheel 54. FIG. 11 shows the finished blade, having a shank 56 and sharp blade proper 58 with cutting edge 60.

Figure 12:
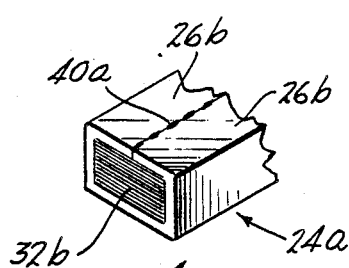
FIG. 12 is a fragmentary perspective view of another embodiment of enclosure for encapsulating the stack of foils.

A modification of the invention is illustrated in FIG. 12, wherein a bundle 32a of high- and low-carbon foils is encapsulated in a casing 24a without the use of sandwiching stripper plates. The rim portions 26b of the casing 24a are fuller and become abutted when folded in. Spot welds 40a join the rim portions 26b to each other. Or, they can be joined by a seam weld (not shown).

A preferred procedure, after initial forging has been completed and stripping of the billet has been done, as by grinding, for example, is to further work the billet toward its ultimate configuration, as by forging and/or grinding. Then the billet can be thereafter hardened by heating, quenching and tempering, and subsequently finish ground to the final configuration.

I have found that my improved method of fabricating Damascus blades or cutters as set forth above is especially simple and easy to practice, in addition to being economical and resulting in a more uniform, improved product. The numerous advantages listed above have been proved by actual experience in manufacture, and the invention thus constitutes a distinct improvement and advance in the art.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. The method of making a heterogeneous blade-like member constituted of different metals, which includes the steps of working metal to form an open metal enclosure, depositing a stack of different metallic foils in said enclosure through the opening thereof, folding-in portions of said enclosure on said stack of foils to form with said enclosure a tight assemblage, heating said assemblage and applying force to said heated assemblage to attenuate it and bond together the foils of said stack, and thereafter removing said enclosure from the attenuated stack of foils.

2. The method of claim 1, wherein:
   (a) said member is a cutting blade having a sharp edge,
   (b) said method further including the additional step of grinding said attenuated stack of foils to provide a sharp edge thereon.

3. The method of claim 2, wherein:
   (a) said cutting blade constitutes an elongate knife blade,
   (b) said step of grinding the blade includes removing metal along a longitudinal edge of the blade.

4. The method of claim 1, wherein:
   (a) the step of working metal comprises stamping a piece of sheet metal to provide an opening with rim portions that can be folded inward.

5. The method of claim 4, wherein:
   (a) the enclosure is a U-shaped metal channel having a side opening and two end openings.

6. The method of claim 5, wherein:
   (a) the folding-in of portions of the enclosure comprises bending inward side wall edge portions of said channel.

7. The method of claim 1, wherein:
   (a) the step of applying force to the assemblage comprises hammering with an impact tool.

8. The method of claim 7, wherein:
   (a) the step of hammering the assemblage with an impact tool comprises applying force with a rounded die.

9. The method of claim 8, wherein:
   (a) the step of hammering the assemblage comprises applying force to both sides of the assemblage with rounded dies.

10. The method of claim 1, wherein:
    (a) the step of hammering the assemblage comprises applying force with a rounded die and thereafter with a flat die.

11. The method of claim 1, wherein:
    (a) the step of removing the casing and metal plate comprises grinding the assemblage.

12. The method of claim 1, wherein:
    (a) the foils are rectangular and the enclosure is elongate with a side opening.

13. The method of claim 1, and including the further step of joining the folded-in portions of the enclosure to each other prior to the heating of the assemblage.

14. The method of claim 13, wherein:
    (a) the joining of the folded-in portions of the enclosure to each other is done by welding.

15. The method of claim 1, wherein the heating is carried out to a forging temperature.

16. The method of claim 1, wherein the heating is carried out to a welding temperature.

17. The method of making a heterogeneous blade-like member constituted of different metals, which includes the steps of working metal to form an open metal enclosure, depositing a stack of different metallic foils in said enclosure through the opening thereof, placing a metal stripping plate in said enclosure on top of said stack of foils, folding-in portions of said enclosure on said metal plate so as to compress said stack of foils to form with said enclosure a tight assemblage, heating said assemblage and applying force to said heated assemblage to attenuate it and bond together the foils of said stack, and thereafter removing said enclosure and metal plate from the attenuated stack of foils.

18. The method of claim 17, and including the further step of welding the folded-in portions of the enclosure to said metal plate prior to the heating of the assemblage to the forging temperature.

19. The method of claim 17, and including the further step of welding the folded-in portions of the enclosure to each other prior to the heating of the assemblage.

20. The method of claim 17, wherein the metal plate is stainless steel and the metallic foils comprise carbon steel.

21. The method of claim 17, wherein the metal plate has a refractory coating to minimize the tendency for its being welded to the stack of foils.

* * * * *